US005084716A

United States Patent [19]

[11] Patent Number: 5,084,716

Koumura et al.

[45] Date of Patent: Jan. 28, 1992

[54] IMAGE FORMING APPARATUS USING ELECTRIC CURRENT TO TRANSFER INK TO A MASTER AND REMOVE EXCESS INK FROM THE MASTER BEFORE TRANSFERRING THE REMAINING INK TO RECORDING MEDIUM

[75] Inventors: Noboru Koumura, Narashino; Shoji Kikuchi, Yokohama; Noboru Tohyama, Kawasaki, all of Japan

[73] Assignee: Canon Kabushiki Kaisha, Tokyo, Japan

[21] Appl. No.: 557,010

[22] Filed: Jul. 25, 1990

[30] Foreign Application Priority Data

Jul. 27, 1989 [JP] Japan ................................ 1-196044

[51] Int. Cl.[5] ......................... B41M 5/20; G01D 5/16

[52] U.S. Cl. ................................ 346/140 R; 101/465; 101/489; 346/1.1

[58] Field of Search ............................ 346/140 R, 1.1; 101/489, 465, 466, 478, 423, 425, DIG. 37; 355/296, 307; 106/22, 20

[56] References Cited

U.S. PATENT DOCUMENTS 4,838,940 6/1989 Kan et al. ............................ 106/22
4,881,084 11/1989 Kan et al. ............................ 346/1.1
4,920,361 4/1990 Arahara et al. ................. 346/140 R
4,962,389 10/1990 Kan et al. ...................... 346/140 R
4,972,200 11/1990 Arahara ......................... 346/140 R

FOREIGN PATENT DOCUMENTS 0322816 7/1989 European Pat. Off. .
0336238 10/1989 European Pat. Off. .
0352796 1/1990 European Pat. Off. .

*Primary Examiner*—Benjamin R. Fuller
*Assistant Examiner*—Scott A. Rogers
*Attorney, Agent, or Firm*—Fitzpatrick, Cella, Harper & Scinto

[57] ABSTRACT

An image forming apparatus includes a master having a conductive portion and an insulating portion which form a pattern; an applicator for applying the ink material on the master wherein deposition of the ink material onto the master is different depending on a direction of electric current flowing through the ink material; an excessive ink material remover, contactable to the ink material applied on the master by the applicator, for removing excessive ink material with a voltage applied between the master and the excessive ink material remover.

18 Claims, 5 Drawing Sheets

IMAGE FORMING APPARATUS USING ELECTRIC CURRENT TO TRANSFER INK TO A MASTER AND REMOVE EXCESS INK FROM THE MASTER BEFORE TRANSFERRING THE REMAINING INK TO RECORDING MEDIUM

FIELD OF THE INVENTION AND RELATED ART

The present invention relates to an image forming apparatus and method using a recording material having a viscosity which is changeable by application of electricity thereto, wherein the recording material is selectively contacted to or spaced from an electrode. The image forming apparatus may be in the form of a printer or the like.

An example of the image formation of the above-mentioned type is disclosed in U.S. Ser. No. 499,579 (with priority based on Japanese Patent Application No. 70299/1988), which has been assigned to the assignee of the present application, for example.

Referring first to FIG. 2, there is shown an example of the image forming process. FIG. 2 is an enlarged sectional view of an image forming station including a pair of electrodes 1 and 2, a recording material 3 interposed between the electrodes 1 and 2 and having such a property that the viscosity or adhesiveness thereof changes by flowing current therethrough and an insulating portion 4 in the form of an image on the electrode 2.

The recording material comprises liquid dispersion medium and electrolytic material.

An example of the liquid dispersion medium usable for the recording material in the present invention is polyatomic alcohol such as ethylene glycol propylene glycol, diethylene glycol, triethylene glycol, tetraethylene glycol, polyethylene glycol (weight average molecular weight of approximately 100–1,000), ethylene glycol monomethyl ether, ethylene glycol monoethyl ether, ethylene glycol monobutyl ether, methyl carbitol or the like. One of the above or a combination of the above are usable. The ink preferably contains 40–95%, further preferably 60–85% by weight of the liquid dispersion medium. The polyatomic alcoholic dispersion medium may be mixed with another liquid dispersion medium. It is preferable that the recording material contains 10–100% by weight of the polyatomic alcoholic dispersion medium on the basis of the total liquid dispersion medium.

Another example of the liquid dispersion medium is water. Further examples include triethanol amine, formamide dimethylsulfoxide, N-methyl-2-pyrrolidone, 1,3-dimethylimidazolidinone, N-methylacetamide, ethylene carbonate, acetamide, succinonitrile dimethylsulfoxide, furfuryl alcohol, N,N-dimethylformamide, or the like. One of them or a mixture thereof are usable.

The electrolytic material preferably does not produce halogen ions by electrolysis. It is further preferable such that the material is not deposited by the electrolysis, and has an electric conductivity to permit smooth control of the adhesion of the recording material by the voltage.

The preferable electrolytic material usable in the recording material of the present invention is, for example, $LiBF_4$, $NaPF_6$, $NH_4PF_6$ or $CH_3COONa$, or the like. One of the them or a combination of them is usable.

In FIG. 3, a voltage is applied across the recording medium by one of the electrodes connected with a positive potential, and the other electrode 2 connected with a negative potential, constituting the image forming station.

In FIG. 4, the electrodes are spaced more from each other while the voltage across the electrodes is maintained. In this Figure, it will be understood that the recording material 3 is not deposited on the portion where the recording medium 3 has been in direct contact with the electrode 2. Thus, the recording material 3 is selectively deposited on the insulating portion 4 of the electrode 2. A pattern is formed by the recording material corresponding to the pattern provided by the electrode and the insulating portions.

In FIG. 5, the opposite voltage is applied between the electrodes, that is, the electrodes 2 and 1 are supplied with positive and negative polarities, respectively.

In FIG. 6, the electrodes are spaced more from each other while the voltage is maintained between the electrodes. In this case, the recording material 3 is separated from the electrode 1 and is deposited on the electrode 2.

FIG. 7 shows the state in which no voltage is applied between the electrodes, and the electrodes are spaced apart. Due to the viscosity or adhesive property of the recording medium 3, the recording material is deposited both to the electrodes 1 and 2, so that no image is formed by the recording material on either of the electrodes.

When a printing apparatus is constructed using the above-recording principle, a master is provided by forming a pattern of the insulating portions 4 on the electrode 2, as shown in FIG. 4. When the printing is effected using the recording material 3 and such a master, it is possible to regulate, after the recording material application step, the thickness of the recording material 3 on the master (electrode 2) to prevent excessive application thereof in consideration of the dryness of the recording material and the spread of the image.

In doing so, if the surface of the master is rubbed with a roller or the like after the step of FIG. 4, the recording material 3 may be pushed out of the insulating portion 4 constituting the pattern, with the result that the printed image is not sharp.

SUMMARY OF THE INVENTION

It is a principal object of the present invention to provide an image forming apparatus using a recording material having a property which changes with electric current flowing therethrough, wherein the amount of application of the recording material on the master is suitably regulated.

It is another object of the present invention to provide an image forming apparatus wherein the excessive application of the recording material on the master is prevented to provide a high quality image from the master.

According to an embodiment of the present invention, there is provided an image forming apparatus, comprising: a master having a conductive portion and an insulating portion which form a pattern; applying means for applying ink material on the master wherein deposition of the ink material onto said master is different depending on a direction of electric current flowing through the ink material; and excessive ink material removing means, contactable to the ink material applied on the master by said applying means, for removing excessive ink material with a voltage applied between the master and said excessive ink material removing means.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1A:
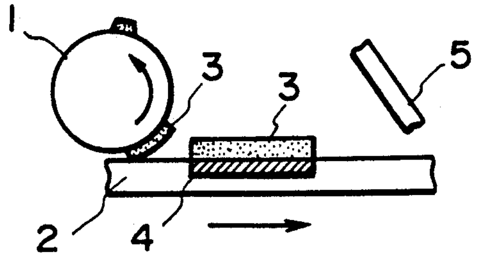
FIGS. 1A, 1B and 1C illustrate in cross-section an image forming process according to an embodiment of the present invention.
Figure 3:
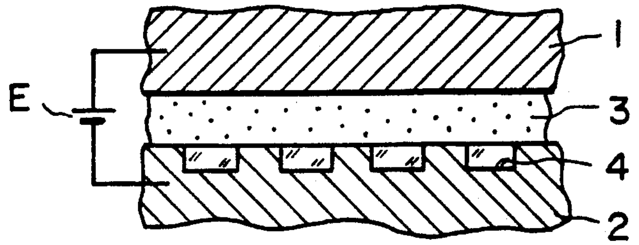
Figure 4:
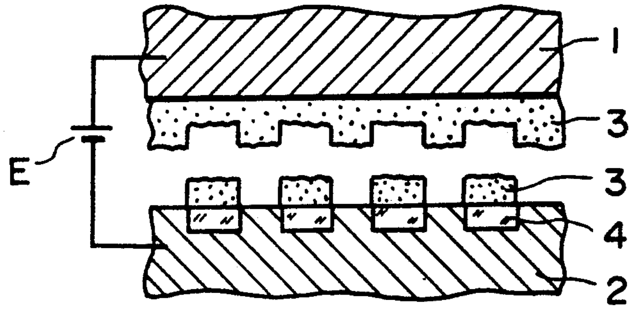
Figure 5:
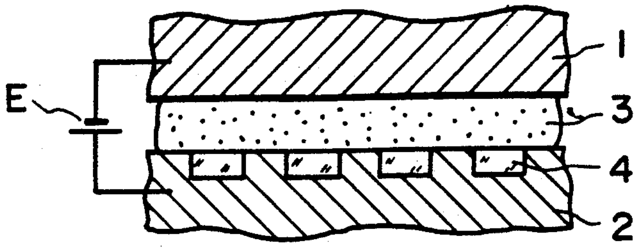
Figure 6:
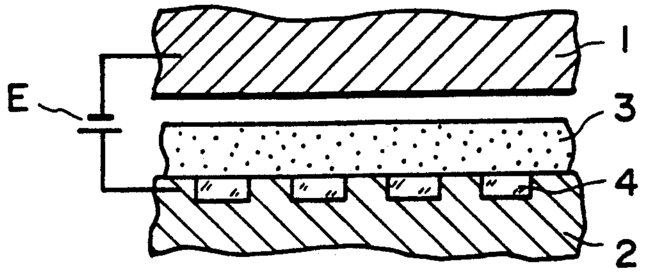
Figure 7:
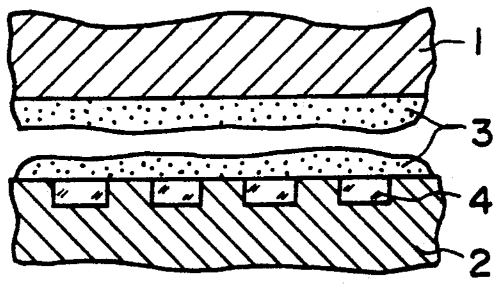

In FIG. 1A, the recording material has been applied on the electrode 2 which is a print master having a pattern and is movable in the direction indicated by an arrow, through the process steps described in conjunction with FIGS. 3 and 4. The recording material 3 is brought to the insulating portion 4 (pattern) by the electrode 1 in the form of a roller. At this time, the recording material on the insulating portion 4 has a large thickness, and is pressed on the pattern in the next step. Therefore, it is preferable that the thickness thereof is regulated to a predetermined level. The regulating operation is performed by a blade 5 at the right side of FIG. 1A.

Figure 1B:
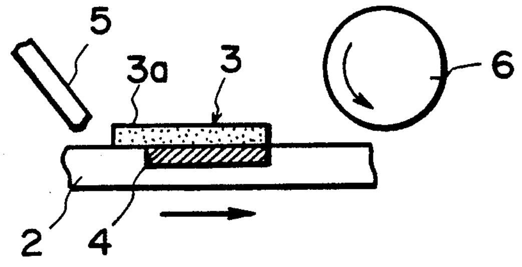

FIG. 1B shows the state provided after the recording material 3 on the insulating portion 4 is wiped by an elastic blade 5 made of a synthetic resin material. By the regulating action of the blade 5, the recording material 3 is partly spread out of the pattern of the insulating portion 4 to produce a spread 3*a*. If the recording material 3 is transferred onto an image receiving material such as paper from the master having the spread, the image is thickened or spread, so that the image quality is degraded.

Figure 1C:
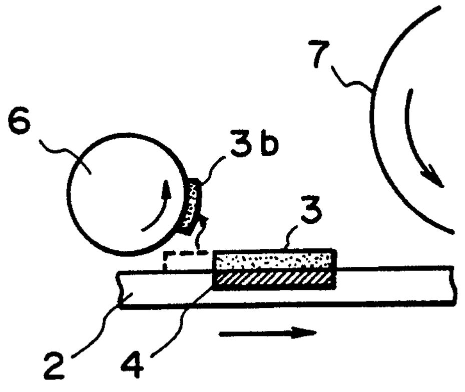
Figure 2:
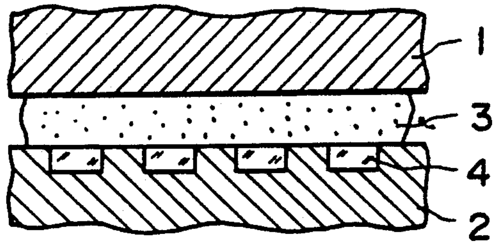
FIGS. 2, 3, 4, 5, 6 and 7 show the respective steps of the image formation mechanism used in the present invention.

FIG. 1C shows a process step for removing the excessive recording material, according to an embodiment of the present invention. An electrode roller 6 rolls on the master, by which the recording material 3*b* outside the insulating portion 4 is removed. The electrode roller 6 is supplied with a positive (+) voltage, similarly to FIG. 4. Thereafter, an image receiving material 7 such as paper is overlaid on the master, so that the recording material on the master is transferred onto the image receiving material 7, so that the printing is effected.

In the foregoing description, the blade regulates the recording material 3 on the master (FIG. 1B). This is not always necessary, but the excessive recording material removing step of FIG. 1C may be performed directly after the application step of FIG. 1A. In place of the blade 5, a roller is usable. The process steps of FIGS. 1B and 1C may be repeated a plurality of times.

Figure 8:
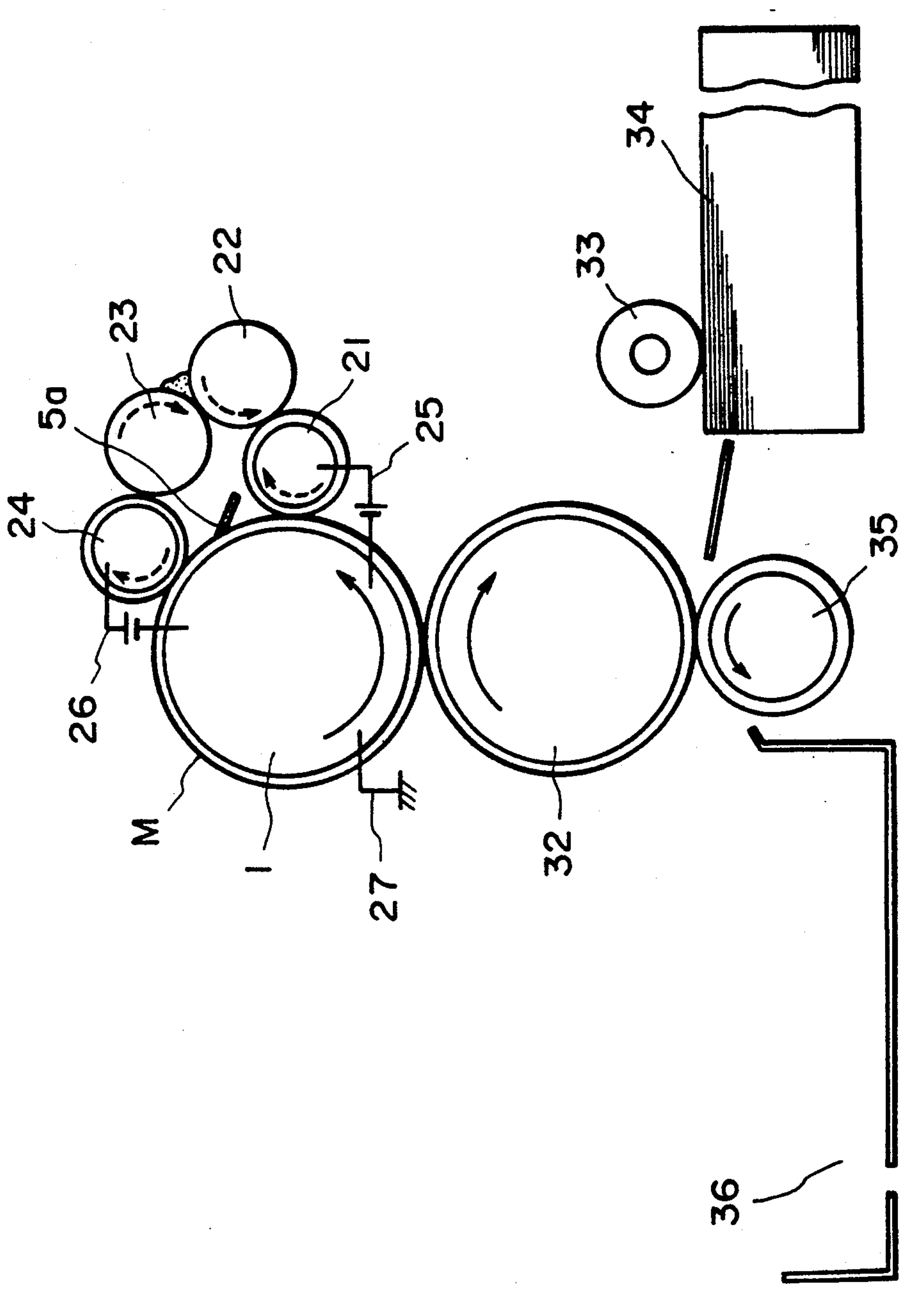
FIGS. 8 and 9 are sectional views of image forming apparatuses according to embodiments of the present invention.
Figure 9:
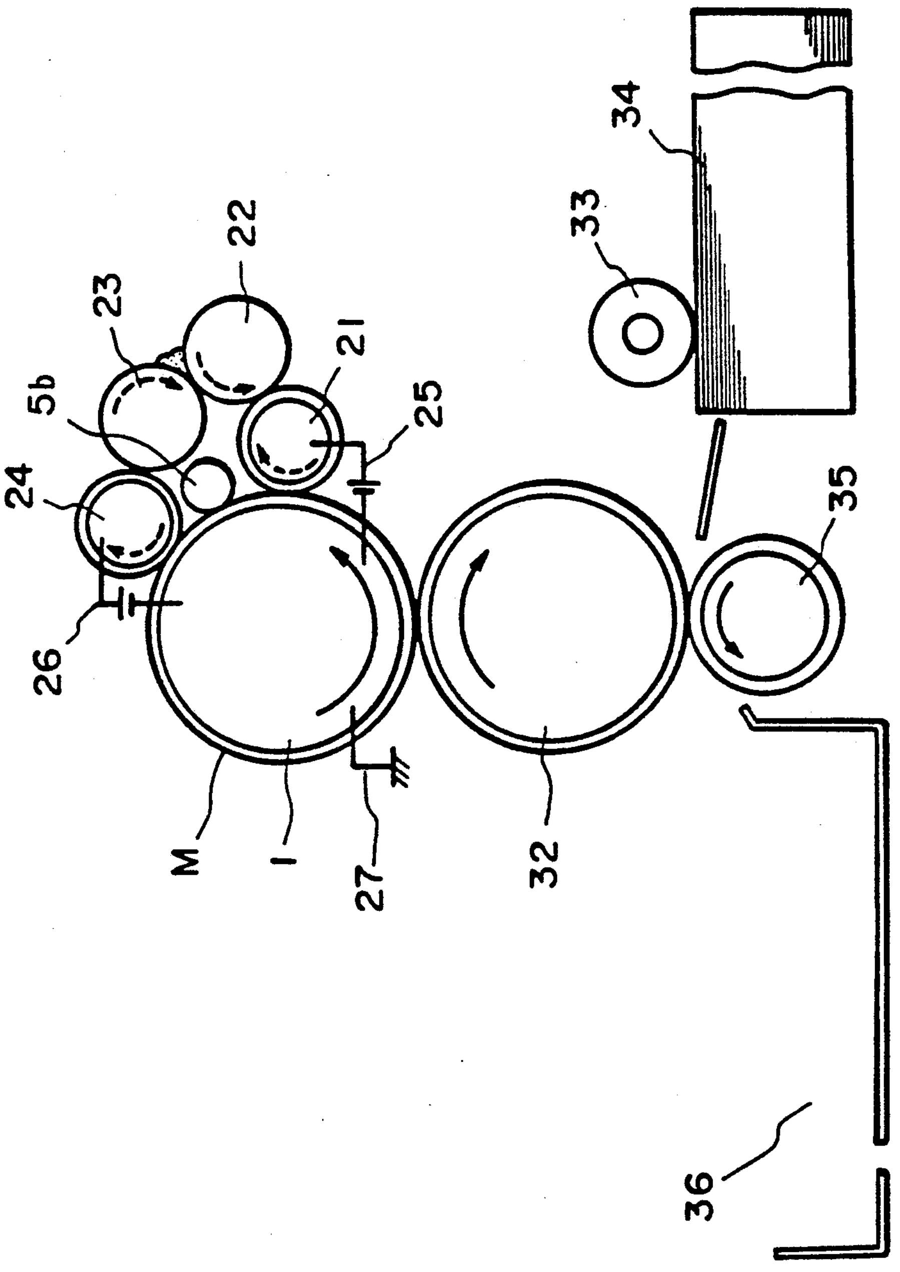

FIGS. 8 and 9 are sectional views of printing machines using the process. An ink roll 22 retaining thereon the recording material in the form of ink, rotates in a direction indicated by an arrow. By the rotation, the ink is transferred to an ink retaining roll 21 (first inking means). At this time, the voltage is applied from a voltage source 25 between the ink retaining roll 21 (positive) and the master (and a master drum M). In accordance with the principle having been described in conjunction with FIGS. 3 and 4, the ink supplied from the roll 21 is selectively transferred t the non-conductive portion on the master (not shown), the master having the conductive portion provided by copper foil fixed on the master drum M and having the non-conductive portion made of plastic resin or the like.

The imagewisely applied ink is made flush by the blade 5*a* in FIG. 8, or by a conductive metal roller 5*b* in FIG. 9. The excessive portion of the image ink on the master, that is, the ink extending into the conductive portion, is removed by the roller 24 by flowing current from the power source 26 between the ink retaining roll 24 (positive) (second inking means) and the master (and the master drum M) (negative).

Then, the ink image thus formed is transferred onto a blanket 32 (an intermediate medium) press-contacted to the master drum M, and then is transferred onto the recording medium such as a sheet of paper through a nip formed between the blanket 32 and the pressure drum 35.

The clearances between the ink retaining roll 21, the ink roll 22, the ink roll 23 and the ink retaining roll 24 are approximately 0.1 mm. Each of the ink retaining rolls 21 and 24 has a diameter of approximately 32 mm and includes a steel core coated with a conductive rubber layer having a thickness of 5 mm. Each of the ink rolls 22 and 23 is made of steel plated with platinum. The master drum M has a diameter of approximately 160 mm, and includes light alloy core coated with a conductive rubber layer having a thickness of approximately 5 mm. The voltage provided by the voltage sources 25 and 26 is approximately 30 V (DC) per 80 mm (image formation width). The blanket drum 32 has a diameter of approximately 160 mm made of light alloy and coated with a rubber layer having a thickness of approximately 5 mm. In place of the rubber layer, a blanket sheet having the equivalent thickness may be fixed on the surface of the light alloy.

Using such an apparatus, the recording operation was performed at a recording speed of approximately 1,000 mm/sec with the rotational speed of approximately 120 rpm.

The recording material (ink) used contained:

| | parts by weight |
|---|---|
| Glycerin | 66 |
| $NiBF_4$ | 7 |
| Carbon black | 7 |
| Colloidal silicate hydride | 34 |
| Water | 22 |

The ink was black.

As described in the foregoing, according to the present invention, only the excessive recording material is removed from the master, and also, the amount of the recording material application to the master can also be regulated. Therefore, the image quality is improved, and it can be avoided that the drying period is undesirably made long.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:

a master having a conductive portion and an insulating portion which form a pattern, ink material being transferable from said master to a recording medium;

applying means for applying the ink material onto said master wherein deposition of the ink material onto said master is dependent on a direction of electric current flowing through the ink material; and excessive ink material removing means, in contact with the ink material applied on said master by said applying means, for removing excessive ink material with a voltage applied between said master and said excessive ink material removing means, the excessive ink material being removed by said removing means before remaining ink material is transferred from said master to the recording medium.

2. An apparatus according to claim 1, wherein a potential of said applying means is such that the ink material is retained on said applying means.

3. An apparatus according to claim 2, wherein said applying means comprises a conductive roller.

4. An apparatus according to claim 2, wherein one and the same conductive roller functions both as said applying means and said removing means.

5. An image forming apparatus, comprising:

a master movable along an endless path and having a conductive portion and an insulating portion which form a pattern, ink material being transferable from said master to a recording medium;

applying means for applying the ink material onto said master, wherein deposition of the ink material onto said master is dependent on a direction of an electric current flowing through the ink material, wherein a potential of said applying means is retained at a potential capable of attracting the ink material thereon; and excessive ink material removing means, in a form of a conductive roller in contact with the ink material applied on said master by said applying means, for removing excessive ink material with a voltage applied between said master and said excessive ink material removing means, the excessive ink material being removed by said removing means before remaining ink material is transferred from said master to the recording medium.

6. An apparatus according to claim 5, wherein one and the same conductive roller functions both as said applying means and said removing means.

7. An apparatus according to claim 5, wherein said applying means and said removing means are arranged along a direction of movement of said master.

8. An image forming apparatus, comprising:

a master movable along an endless path and having a conductive portion and an insulating portion which form a pattern;

applying means for applying ink material onto said master, wherein deposition of the ink material onto said master is dependent on a direction of an electric current flowing through the ink material, wherein a potential of said applying means is retained at a potential capable of attracting the ink material thereon;

excessive ink material removing means, in the form of a conductive roller in contact with the ink material applied on said master by said applying means, for removing excessive ink material with a voltage applied between said master and said excessive ink material removing means;

an intermediate material for subsequently receiving remaining ink material from said master;

means for supplying a sheet material to said intermediate material; and means for transferring the ink material from said intermediate medium to the sheet material.

9. An apparatus according to claim 8, wherein one and the same conductive roller functions both as said applying means and said removing means.

10. An apparatus according to claim 8, wherein said applying means and said removing means are arranged along a direction of movement of said master.

11. An image forming process using ink material having such a property that when the ink material is presented between electrodes, deposition of the ink material onto the electrodes is dependent on a direction of electric current through the ink material, said process comprising the steps of:

providing a master having an insulating portion and a conductive portion which functions as one of the electrodes;

applying the ink material onto the master;

removing excessive ink material from the master by using an excessive ink material removing member in contact with the ink material on the master while the removing member in contact with is supplied with a bias voltage; and subsequently transferring remaining ink material from the master to a recording medium.

12. A process according to claim 11, wherein a potential of means for effecting said applying step is maintained at a level capable of attracting thereon the ink material.

13. A process according to claim 12, wherein the means for effecting said applying step comprise a conductive roller.

14. A process according to claim 13, wherein the conductive roller also functions to remove the excessive ink material.

15. An image forming process using ink material having such a property that when the ink material is presented between electrodes, deposition of the ink material onto the electrodes is dependent on a direction of electric current through the ink material, said process comprising the steps of:

providing a master movable along an endless path and having an insulating portion and a conductive portion which functions as one of the electrodes; and applying the ink material onto the master by a conductive roller;

removing excessive ink material from the master by using an excessive ink material removing member in a form of a conductive roller in contact with the ink material on the master while the conductive roller is supplied with a bias voltage; and subsequently transferring remaining ink material from the master to a recording medium.

16. An image forming process using ink material having such a property that when the ink material is presented between electrodes, deposition of the ink material onto the electrodes is dependent on a direction of electric current through the ink material, said process comprising the steps of:

providing a master movable along an endless path and having an insulating portion and a conductive portion which functions as one of the electrodes;

applying the ink material onto the master by a conductive roller;

removing excessive ink material from the master by using an excessive ink material removing member in a form of a conductive roller in contact with the ink material on the master while the conductive roller is supplied with a bias voltage;

subsequently transferring remaining ink material from the master to an intermediate material; and transferring the ink material from the intermediate material to a sheet material.

17. A process according to claim 16, wherein the conductive roller used in said applying step and the conductive roller used in said removing step are arranged along a direction of movement of the master.

18. A process according to claim 17, wherein a potential of means for effecting said applying step is maintained at a level capable of attracting thereon the ink material.

* * * * *

UNITED STATES PATENT AND TRADEMARK OFFICE

CERTIFICATE OF CORRECTION

PATENT NO. : 5,084,716

DATED : January 28, 1992

INVENTOR(S) : KOUMURA, ET AL.

It is certified that error appears in the above-identified patent and that said Letters Patent is hereby corrected as shown below:

AT COLUMN 4:

Line 2, "transferred t" should read --transferred to--.

AT COLUMN 6:

Line 28, "in contact with" should be deleted;

Line 37, "comprise" should read --comprises--.

Signed and Sealed this

Second Day of November, 1993

Attest:

Bruce Lehman

BRUCE LEHMAN

*Attesting Officer* *Commissioner of Patents and Trademarks*